US012257686B2

(12) United States Patent
Qiu

(10) Patent No.: US 12,257,686 B2
(45) Date of Patent: Mar. 25, 2025

(54) MULTIFUNCTIONAL LIFE-SAVING HAMMER

(71) Applicant: NINGBO HUAZHOU OPTOELECTRONIC TECHNOLOGY CO., LTD, Ningbo (CN)

(72) Inventor: Enyuan Qiu, Ningbo (CN)

(73) Assignee: NINGBO HUAZHOU OPTOELECTRONIC TECHNOLOGY CO., LTD, Ningbo (CN)

( * ) Notice: Subject to any disclaimer, the term of this patent is extended or adjusted under 35 U.S.C. 154(b) by 374 days.

(21) Appl. No.: 17/820,141

(22) Filed: Aug. 16, 2022

(65) Prior Publication Data

US 2023/0294262 A1 Sep. 21, 2023

(30) Foreign Application Priority Data

Mar. 21, 2022 (CN) ......................... 202210279380.1

(51) Int. Cl.
*B25F 1/00* (2006.01)
*A62B 3/00* (2006.01)
*B25F 1/02* (2006.01)

(52) U.S. Cl.
CPC .............. *B25F 1/006* (2013.01); *A62B 3/005* (2013.01); *B25F 1/02* (2013.01)

(58) Field of Classification Search
CPC ................................. B25F 1/006; A62B 3/005
USPC .................................... 7/143, 244; 81/25, 26
See application file for complete search history.

(56) References Cited

U.S. PATENT DOCUMENTS 1,297,386 A * 3/1919 Michki .................... B25D 1/02 81/26
6,874,186 B2 * 4/2005 Lin .......................... B25D 1/00 81/20
6,928,899 B1 * 8/2005 Lin ........................... B25F 1/02 81/20
2013/0227795 A1 * 9/2013 Franken ................. A62B 3/005 29/527.1

FOREIGN PATENT DOCUMENTS

CN 211709214 U 10/2020
CN 212996509 U 4/2021
CN 215318492 U 12/2021

* cited by examiner

*Primary Examiner* — Hadi Shakeri
(74) *Attorney, Agent, or Firm* — INNOVATION CAPITAL LAW GROUP, LLP; Vic Lin

(57) ABSTRACT

The present invention discloses a multifunctional life-saving hammer, comprising a hammer body. Two ends of the hammer body are respectively connected and fixed with a pointed hammer and a butt hammer, a hammer handle is fixedly connected to the middle of the hammer body and is formed by detachably screwing and fixing a hollow tube-shaped connector and a handle bar, and a tail of the handle bar is provided with a tail cover in a screwing manner. A head of the hammer handle is provided with a screwdriver device, a tail of the hammer handle is provided with a pop-up mini life-saving hammer device, and a surface of one side of an outer circumferential surface is provided with a cutting knife device.

20 Claims, 6 Drawing Sheets

MULTIFUNCTIONAL LIFE-SAVING HAMMER

BACKGROUND OF THE INVENTION

1. Technical Field

The present invention relates to the technical field of life-saving appliances, in particular to a multifunctional life-saving hammer.

2. Description of Related Art

A life-saving hammer, also called a safety hammer, is an assistant escape tool mounted in a closed cabin, and is usually mounted in a place where it is easy to get in the closed cabin of a vehicle and the like. In emergency that a fire occurs in the closed cabin of the vehicle or the vehicle falls into water, personnel in the vehicle can get the life-saving hammer conveniently to smash a glass door to escape smoothly. A currently used life-saving hammer usually includes a hammer body and a handle. One end of the hammer body is provided with a pointed hammer and the other end of the hammer body is provided with a butt hammer. This life-saving hammer is single in function and cannot meet requirements of various occasions. For example, when personnel in the vehicle cannot get away as the safety belt is locked, a tragedy will occur. Besides, the existing life-saving hammer is used by a striking force of a user. Tempered glass of windows and doors of the vehicle is firm, and it is needed to apply a certain force to crush the glass. For example, the using space of the life-saving hammer is limited or the vehicle falls into water and is filled with water when the vehicle comes across an emergency, the user wielding the life-saving hammer cannot apply a certain striking force to the glass to crush the glass due to resistance of water. For another example, understrength groups such as the old and children cannot crush the glass by using a conventional life-saving hammer. Thus, they cannot escape. Besides, in the escape process, a screwdriver for opening a fastening screw and the like is often used, and the current life-saving hammer with a single function cannot meet this requirement. Therefore, it is needed to innovate, improve and enhance the prior art.

BRIEF SUMMARY OF THE INVENTION

In order to overcome the deficiencies in the prior art, the present invention provides a multifunctional life-saving hammer which is novel in structure, easy to use, and capable of meeting requirements of various occasions.

The technical solution adopted by the present invention is as follows:

A multifunctional life-saving hammer, comprising a hammer body and a hammer handle, two end surfaces of the hammer body being respectively provided with mounting base holes, twomounting base holes being respectively connected and fixed with a pointed hammer and a butt hammer, one side of a middle of the hammer body being provided with a hammer handle connecting hole, wherein the hammer handle comprises a hollow tube-shaped connector and a handle bar, a tail end opening of the hollow tube-shaped connector is provided with an internal thread, a head of the handle bar is provided with an external thread, the hollow tube-shaped connector and the handle bar are detachably screwed and fixed, a head of the hollow tube-shaped connector is in fixedly connected with the hammer handle connecting hole in a close fit manner, and a top surface of the head of the handle bar is further provided with a first inner cavity hole;

a tail of the handle bar is provided with a second inner cavity hole opened in a bottom end surface, and an opening of the second inner cavity hole is provided with the internal thread; a tail cover provided with the external thread at a head is screwed and fixed with the opening of the second inner cavity hole, and an inner bottom surface of the tail cover is provided with a first center through hole; and an upper portion of the hammer handle is provided with a screwdriver device, and a tail of the hammer handle is provided with a pop-up mini life-saving hammer device.

Further, the mounting base holes formed in two ends of the hammer body are respectively provided with threaded openings, connecting ends of the pointed hammer and the butt hammer are respectively provided with external threads, and the pointed hammer and the butt hammer are respectively screwed and fixed to the mounting base holes.

Further, at least one of the two mounting base holes is provided with a through hole connected with the hammer handle connecting hole, and the through hole is provided with a positioning fixed bolt for preventing the connector and the hammer handle connecting hole from loosening.

Further, an end of one side of the positioning fixed bolt close to a hammerhead is provided with a circular ring, a bottom surface of the circular ring leans against a bottom surface of the hammerhead, an upper surface of the circular ring leans against a step surface where each of the mounting base holes and the through hole transition, a center of a top surface of the positioning fixed bolt is provided with a circular boss, a middle of the connector corresponding to the through hole is provided with a positioning groove, and the circular boss is embedded into the positioning groove to be bolted and fixed.

Preferably, wherein the screwdriver device comprises a screwdriver device component, a screwdriver bit storage cavity consisting of the inner cavity holes of the tube-shaped connector, and a screwdriver handle consisting of the handle bar.

Preferably, wherein the screwdriver device component comprises a screwdriver bit fixing seat, a screwdriver bit and a strong magnet column, the screwdriver device component is fixedly connected to the first inner cavity hole formed in the head of the handle bar in close fit through the screwdriver bit fixing seat, and an upper portion of the screwdriver bit fixing seat stretches out to a surface of an opening end of the first inner cavity hole;

a center of a top surface of the screwdriver bit fixing seat is provided with a hexagonal screwdriver bit mounting hole, an axial circumferential surface of a lower middle part of the screwdriver bit is identical in shape with the screwdriver bit mounting hole, and the lower middle part of the screwdriver bit is placed in the screwdriver bit mounting hole to be in a pluggable fit connection; and a center of a bottom surface of the screwdriver bit mounting hole is provided with a circular through hole and the strong magnet column is fixedly mounted in the circular through hole formed in the center.

Further, an inner circumferential surface of the first inner cavity hole is hexagonal, and the axial circumferential surface of the screwdriver bit fixing seat is in a hexagonal shape capable of being in fit connection with the first inner cavity hole.

Further, two sides corresponding to the outer circumferential surface of the lower middle part of the screwdriver bit fixing seat are provided with elastic positioning sheets, outer surfaces of heads of the two elastic positioning sheets are respectively provided with two symmetrical first inverted buckle feet, a circumferential surface of the first inner cavity hole corresponding to the two first inverted buckle feet is provided with a second positioning groove, and the two first inverted buckle feet are in buckled connection with the second positioning groove.

Preferably, the pop-up mini life-saving hammer device comprises a pop-up mini life-saving hammer device component and an outer shell consisting of the tail of the handle bar and a tail cover screwed with the tail of the handle bar.

Preferably, the pop-up mini life-saving hammer device component comprises a barrel body sealed at a bottom end, a striker pin, a striker pin rod, a pressing cap, a pressing push piece, a force accumulating spring that makes the striker pin pop up and a return spring that makes the pressing push piece return, an upper opening end of the barrel body is connected and fixed with a head cover, and a bottom surface of an inner cavity hole of the barrel body is provided with a second center through hole; a lower end surface of the striker pin rod is provided with a center connecting hole, and an upper end of the striker pin is fixedly connected in the center connecting hole; the striker pin rod is arranged in the inner cavity hole of the barrel body and is able to slide vertically to be in fit connection with the inner cavity hole and the striker pin penetrates through the second center through hole and able to slide vertically to be in fit connection with the second center through hole; two sides of an outer circumferential surface of a lower portion of the barrel body are further provided with symmetrical second inverted buckle feet;

- the force accumulating spring is arranged between an upper surface of the striker pin rod and an inner surface of the head cover; the return spring is disposed around the striker pin;
- a middle of a bottom surface of an inner cavity of the pressing cap is provided with an upward protruding second circular boss, a top surface of the second circular boss is provided with a third center through hole communicated with a bottom end surface of the pressing cap, and an axial circumferential surface of an upper end of the pressing cap is further provided with a limiting protrusion;
- a head of the striker pin is inserted into the third center through hole and is in sliding fit connection with the third center through hole;
- a lower portion of the pressing push piece is a column sleeve provided with an axial through hole, top surfaces on two sides of the through hole are provided with two symmetrical upward flaky elastic push rods, upper portions of the two elastic push rods are opened like bell mouths, surfaces of openings of the bell mouths of the upper portions of the two elastic push rods are respectively provided with two guide through hole straight slots equal in width, and the upper ends of the two guide through hole straight slots are in corresponding buckled connection with the two second inverted buckle feet, respectively;
- the pressing cap and the pressing push piece are sleeved and fixed with each other;
- a pushing lock catch structure that separates the two elastic push rods from the striker pin rod when the striker pin rod is pushed to move toward an upward side of the inner cavity of the barrel body to a setting position is arranged between the two elastic push rods and the striker pin rod; and
- the pressing cap is inserted into the first center through hole from the inner bottom surface of the tail cover, is in sliding fit connection with the first center through hole and partially stretches out to the bottom surface of the tail cover, the limiting protrusion is in abutting joint to the top surface of the first center through hole, and the top surface of the head cover leans against the top surface of the second inner cavity hole.

Further, two sides of the head cover are provided with tongue buckling sheets, the two tongue buckling sheets are respectively provided with buckling holes, two sides of an outer circumferential surface of an upper opening end of the barrel body corresponding to the two buckling holes are provided with buckle feet, and the buckling holes are in corresponding buckled connection with the two buckle feet, respectively. Further, the inner cavity hole of the barrel body is a stepped hole, an upper portion of the stepped hole is larger the lower middle part, a circumferential surface of an upper end of the striker pin rod is provided with a limiting convex ring, and the limiting convex ring is in sliding fit connection with the upper portion of the stepped hole of the barrel body; and two sides of a circumferential surface of the lower middle part of the stepped hole of the barrel body are provided with axially positioned guide chutes, and two sides of an axial circumferential surface of the striker pin rod are provided with convex keys in sliding fit connection with the guide chutes.

Further, a center of a bottom surface of the head cover is provided with a connecting column, the surface of the upper end of the striker pin rod is provided with an upper center blind hole, the force accumulating spring is arranged in the upper center blind hole, and an upper end of the force accumulating spring is disposed around the connecting column.

Further, the limiting protrusion is in a structure of a convex piece distributed at each of four corners with the head surface being arc-shaped.

Further, the bottom end surface of the pressing cap is provided with a counterbore.

Further, two sides of a circumferential surface where the pressing cap and the pressing push piece are connected are respectively provided with two corresponding limiting hole slots, a circumferential surface of the pressing push piece corresponding to the two limiting hole slots is respectively provided with two limiting raised heads, and the two limiting raised heads are in corresponding fit connection with the two limiting hole slots, respectively; and a circumferential surface of an inner cavity of the pressing cap is provided with two corresponding third inverted feet, and the two third inverted buckle feet are respectively buckled to two sides of a top surface of a cylindrical sleeve on a lower portion of the pressing push piece.

Further, the pushing lock catch structure is structured such that inner surfaces of the lower sides of opened starting ends of the bell mouths on the upper portions of the two elastic push rods are respectively provided with two corresponding pushing raised heads; two axial sides of the lower barrel body of the two second inverted buckle feet are provided with two symmetrical windowing holes that are communicated with the inner cavity of the barrel body and extend to the bottom end surface of the barrel all the way, and the two elastic push rods are respectively located in the two windowing holes and are in sliding fit connection when the lower middle parts are static.

Further, the inner and outer surfaces of the two elastic push rods are arc-shaped.

Further, upper surfaces of the two pushing raised heads are respectively perpendicular to the inner surfaces of the two elastic push rods, and the two inner surfaces corresponding to the two pushing raised heads are arc-shaped surfaces.

Further, an end surface of a bottom opening of the second center through hole is further provided with a downward protruding convex ring column, a head of the return spring is in sleeved connection with convex ring column to be positioned, and a tail end of the return spring is in sleeved connection to the second circular convex column to be positioned.

Further, the top surface of the second inner cavity hole is further provided with an upper stepped hole, an upper end of the first center through hole is provided with a lower stepped hole, the first center through hole and the upper stepped hole are kept at a same axis, and the head cover is located in the upper stepped hole to be positioned.

Compared with the prior art, the present invention has the following advantages: besides the functions of the life-saving hammer in the prior art, following functions are further added: by utilizing the pop-up mini life-saving hammer device arranged at the tail of the hammer handle and operated by a pressing manner, when the life-saving hammer wielded in a limited manner cannot apply a certain striking force to the glass to crush the glass of vehicle windows in an emergency of the vehicle, a user can hold the hammer body of the life-saving hammer to attach the pressing end of the pop-up mini life-saving hammer device arranged at the tail of the hammer handle to the glass to crush the glass of the vehicle windows rapidly by pressing, and it is easy and labor-saving to operate; third, the screwdriver device capable of replacing tool bits in different patterns is arranged between the handle and the connector of the hammer body of the life-saving hammer in a hidden manner, which can fit occasions where the screwdriver is needed in the escape process. The structural design of the multifunctional life-saving hammer meets the requirements of survivors in emergencies of the vehicle, and has the characteristics of being novel in design, compact and reasonable in structure and flexible and convenient to use and operate.

Figure 1A:
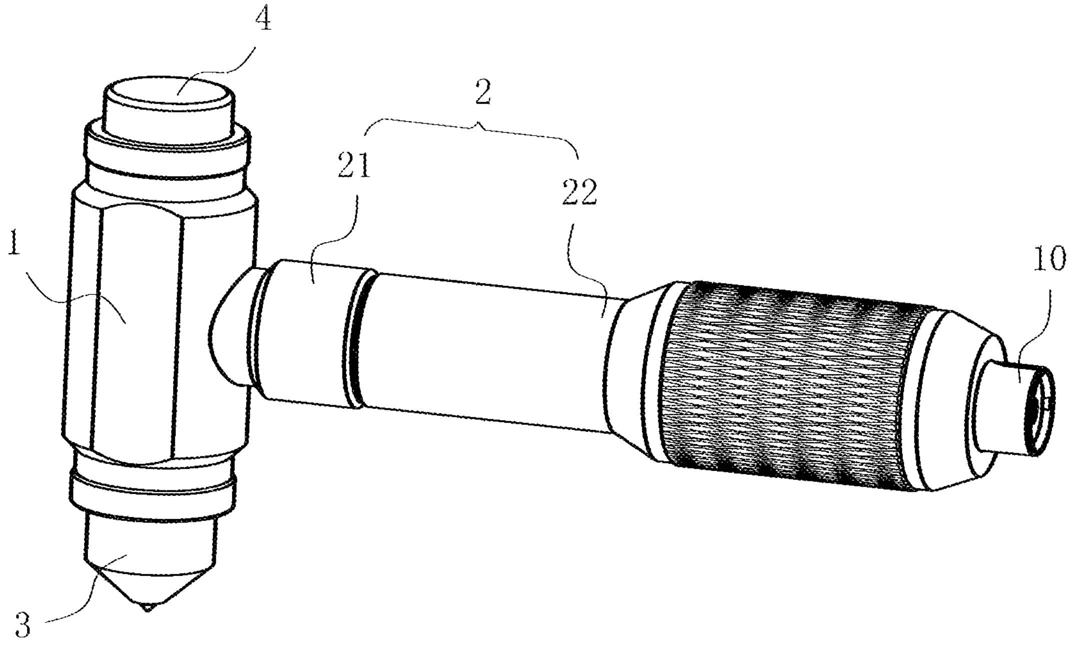
FIG. 1A and FIG. 1B are respectively forward and reverse stereograms of an embodiment of the present invention.

In the drawings, 1—hammer body; 11—mounting base hole; 111—through hole; 12—hammer handle connecting hole; 2—hammer handle; 21—tube-shaped connector; 211—first positioning groove; 22—handle bar; 221—first inner cavity hole; 222—second positioning groove; 3—pointed hammer; 31—pointed cone; 4—butt hammer; 5—positioning fixed bolt; 51—circular ring; 52—first circular boss; 6—screwdriver device component; 61—screwdriver bit fixing seat; 611—elastic positioning sheet; 612—first inverted foot; 613—diaphragmatic circular sheet; 614—screwdriver bit mounting hole;

615—circular through hole; 62—screwdriver bit; 63—strong magnet column;

7—barrel body; 71—buckle foot; 72—second center through hole; 73—guide chute; 74—second inverted foot; 75—windowing hole; 76—convex ring column; 8—striker pin; 9—striker pin rod; 91—center connecting hole; 92—limiting convex ring; 93—convex key; 94—center blind hole; 10—pressing cap; 101—second circular convex column; 102—third center through hole; 103—limiting hole slot; 104—third inverted buckle foot; 105—limiting protrusion; 106—open groove; 107—counterbore; 13—pressing push piece; 131—through hole; 132—elastic push rod; 133—guide through hole straight slot; 134—pushing raised head; 135—limiting raised head; 14—force accumulating spring; 15—return spring; 16—head cover; 161—tongue buckling piece; 162—buckling hole; 163—connecting column; 223—second inner cavity hole; 224—upper stepped hole; 23—tail cover; 230—first center through hole; 231—lower stepped hole; 200—pop-up mini life-saving hammer device component; 201—pushing lock catch structure;

17—blade bearing; 171—screw mounting hole; 172—blade fixing groove; 18—cutting blade; 173—recess; 19—fixing screw; 20—inlet part; 120—screw fixing hole; 300—cutting knife device component.

DETAILED DESCRIPTION OF THE INVENTION

The embodiments of the present invention will be further described in detail below in combination with the accompanying drawings.

Structures of components and parts and directional and positional relations between each other expressed by "front, back, left, right, upper, middle, lower, top and bottom" in characters below all take positions directly facing the accompanying drawings placed in the accompanying drawings in the description as reference of literal expression.

Figure 1B:
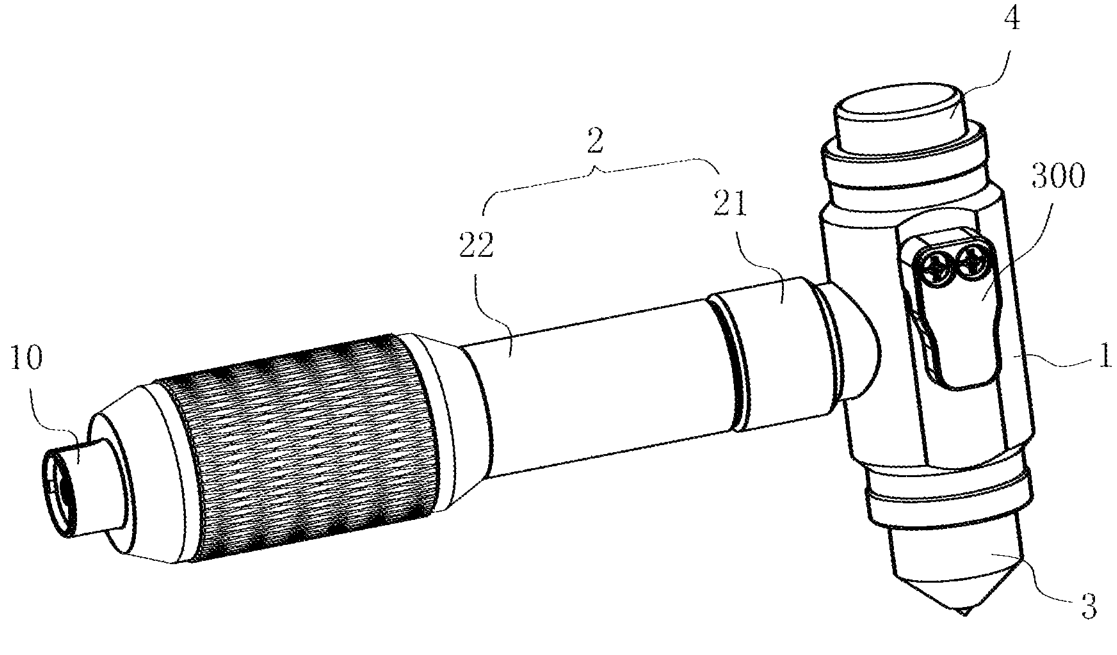
Figure 2:
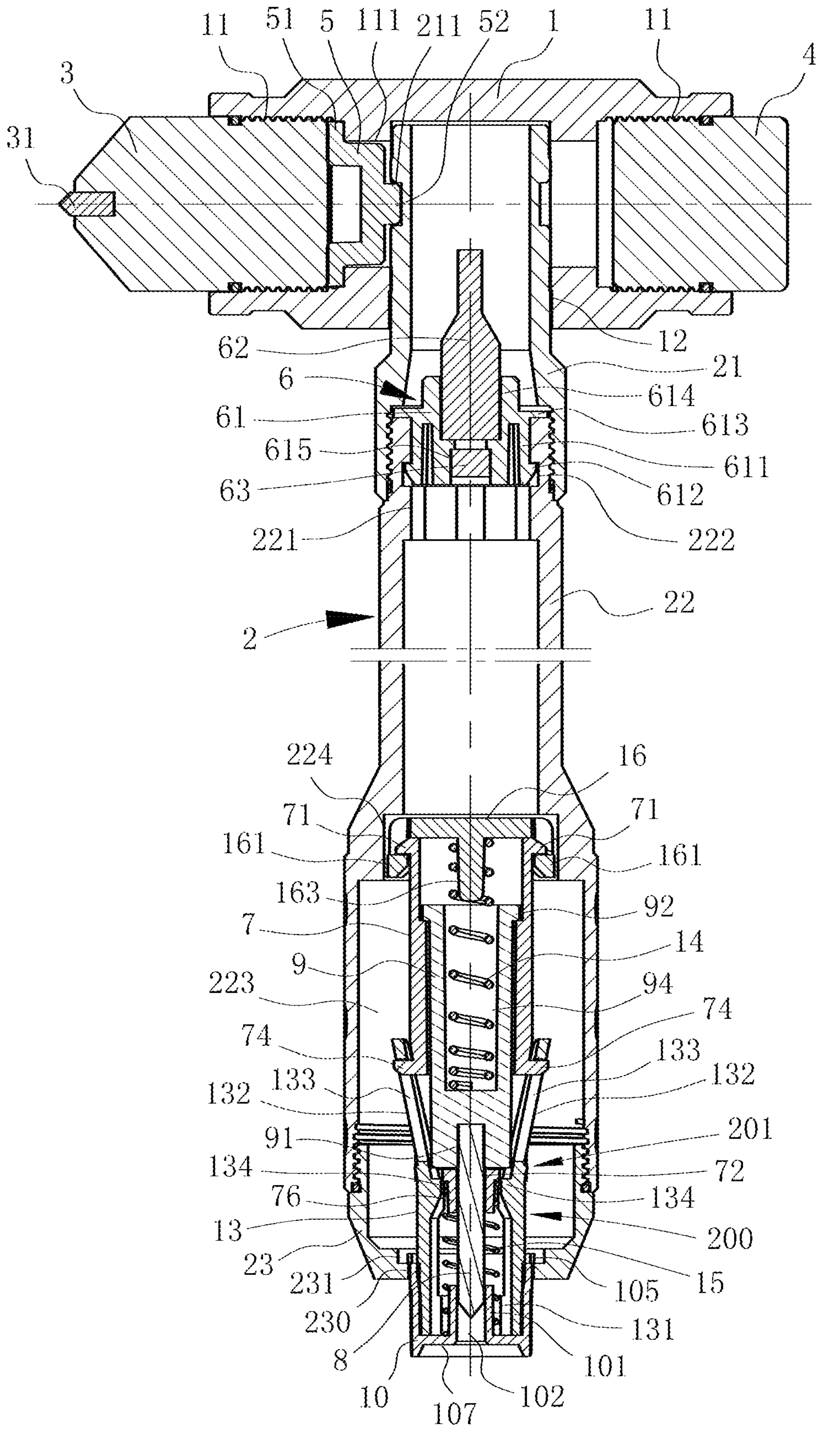
FIG. 2 is a schematic structure diagram of an embodiment of the present invention.
Figure 3:
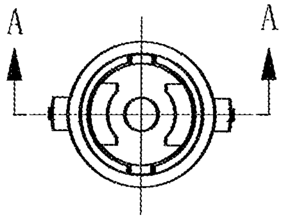
FIG. 3 is a top view of a part of a barrel in a pop-up mini life-saving hammer device in an embodiment of the present invention.
Figure 4:
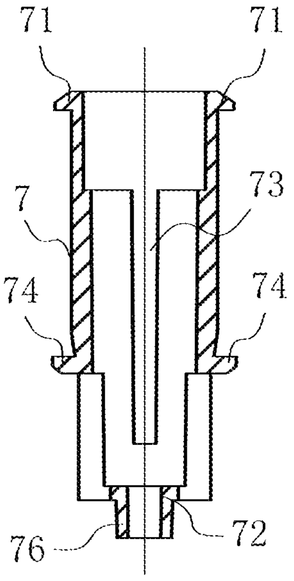
FIG. 4 is an A-A section view of FIG. 3.
Figure 6A:
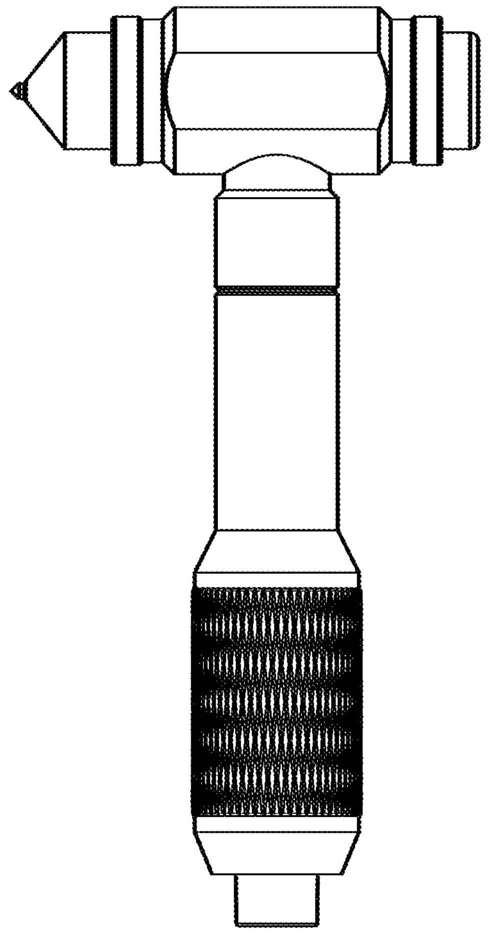
FIG. 6A and FIG. 6B are respectively a front view and a top view of an embodiment of the present invention.
Figure 5:
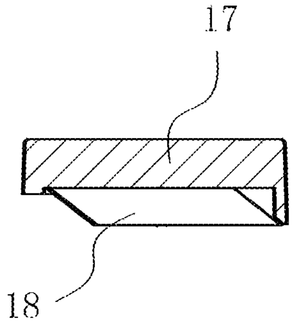
FIG. 5 is a schematic diagram of a partial section structure of a cutting knife device of an embodiment of the present invention.
Figure 6B:
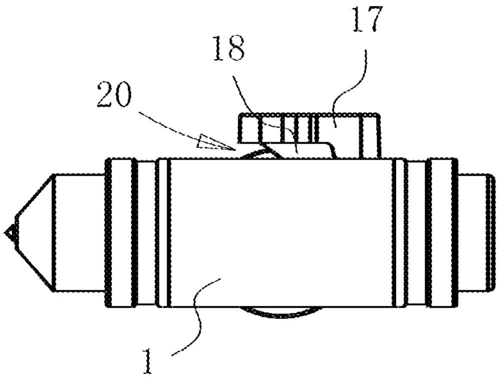
Figure 7:
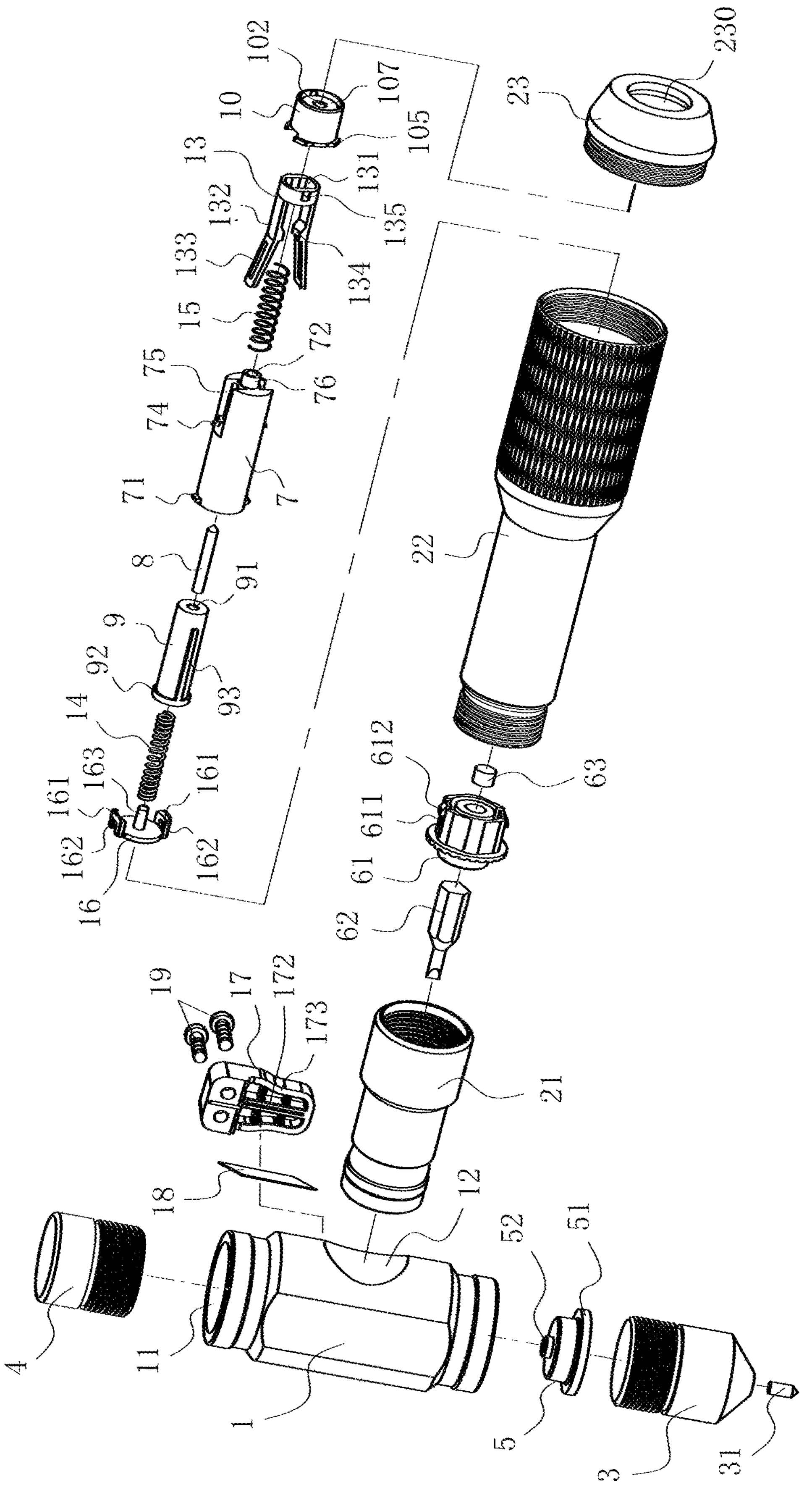
FIG. 7 is a forward stereo exploded view of an embodiment of the present invention.
Figure 8:
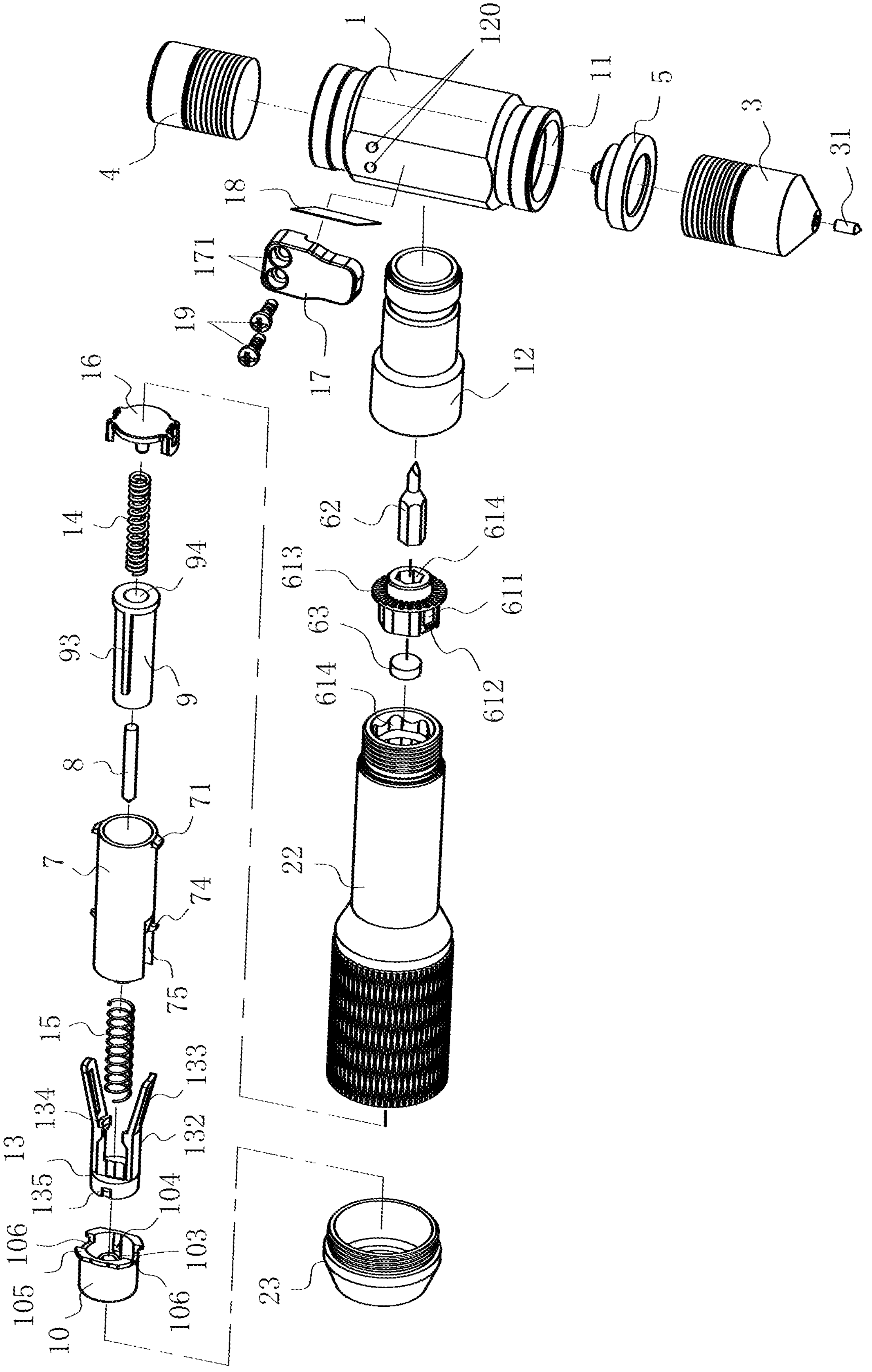
FIG. 8 is a reverse stereo exploded view of an embodiment of the present invention.

Referring to FIG. 1 to FIG. 8, a multifunctional life-saving hammer includes a hammer body 1, a hammer handle 2, a pointed hammer 3 and a butt hammer 4, where two ends of the hammer body 1 are provided with mounting base holes 11, and the middle of the hammer body 1 is provided with a hammer handle connecting hole 12; the mounting base holes 11 formed in two ends of the hammer body 1 are respectively provided with threaded openings, connecting ends of the pointed hammer 3 and the butt hammer 4 are respectively provided with external threads, and the pointed hammer 3 and the butt hammer 4 are respectively screwed and fixed to the two mounting base holes 11; the head of the pointed hammer 3 is embedded with a cone 31 made from a hard material;

the hammer handle 2 includes a hollow tube-shaped connector 21 and a handle bar 22, a tail end opening of the hollow tube-shaped connector 21 is provided with an internal thread, a head of the handle bar 22 is provided with an external thread, the hollow tube-shaped connector 21 and the handle bar 22 are detachably screwed and fixed, a head of the hollow tube-shaped connector 21 is in fixedly connected with the hammer handle connecting hole 12 in close fit manner, and a top surface of the head of the handle bar 22 is further provided with a first inner cavity hole 221;

a tail of the handle bar 22 is provided with a second inner cavity hole 223 opened in a bottom end surface, and an opening of the second inner cavity hole 223 is provided with the internal thread; a tail cover 23 provided with the external thread is screwed and fixed with the opening of the second inner cavity hole 223, wherein the external thread is arranged on a head of the tail cover (23), and an inner bottom surface of the tail cover 23 is provided with a first center through hole 230;

at least one of the two mounting base holes 11 is provided with a through hole 111 connected with the hammer handle connecting hole 12, and the through hole 111 is provided with a positioning fixed bolt 5 for preventing the connector 21 and the hammer handle connecting hole 12 from loosening; an end of one side of the positioning fixed bolt 5 close to a hammerhead is provided with a circular ring 51, a bottom surface of the circular ring 51 leans against a bottom surface of the hammerhead, an upper surface of the circular ring leans against a step surface where each of the mounting base holes 11 and the through hole 111 transition, a center of a top surface of the positioning fixed bolt 5 is provided with a circular boss 52, the middle of the connector 21 corresponding to the through hole 111 is provided with a positioning groove 211, and the circular boss 52 is embedded into the positioning groove 211 to be bolted and fixed;

an upper part of the hammer handle 2 is provided with a screwdriver device; a tail of the hammer handle 2 is provided with a pop-up mini life-saving hammer device; a surface of one side on an outer circumferential surface of the hammer body 1 is provided with a cutting knife device; and the screwdriver device includes a screwdriver device component 6, a screwdriver bit storage cavity consisting of the inner cavity holes of the tube-shaped connector 21, and a screwdriver handle consisting of the handle bar 22.

Figure 9A:
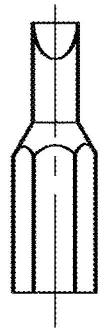
FIG. 9A and FIG. 9B are schematic structure diagrams of a straight screwdriver bit assembled with the present invention.
Figure 10A:
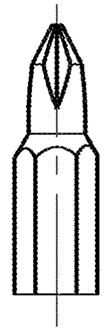
FIG. 10A and FIG. 10B are schematic structure diagrams of a cross head screwdriver bit assembled with the present invention.
Figure 11A:
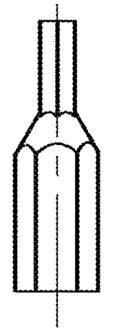
FIG. 11A and FIG. 11B are schematic structure diagrams of a hexagon socket head screwdriver bit assembled with the present invention.
Figure 12A:
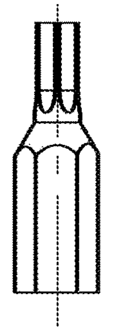
FIG. 12A and FIG. 12B are schematic structure diagrams of a wobbler screwdriver bit assembled with the present invention.
Figure 9B:
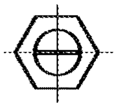
Figure 10B:
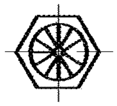
Figure 11B:
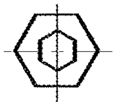
Figure 12B:
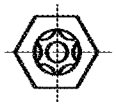

The screwdriver device component 6 includes a screwdriver bit fixing seat 61, a screwdriver bit 62 and a strong magnet column 63, where the screwdriver bit fixing seat 61 and the first inner cavity hole 221 are mounted and fixed in the head of the handle bar 22 in a fit manner, and an upper part of the screwdriver bit fixing seat 61 stretches out to a surface of an opening end of the first inner cavity hole 221;

a center of a top surface of the screwdriver bit fixing seat 61 is provided with a hexagonal screwdriver bit mounting hole 614, an axial circumferential surface of a lower middle part of the screwdriver bit 62 is identical in shape with the screwdriver bit mounting hole 614, and the lower middle part of the screwdriver bit 62 is placed in the screwdriver bit mounting hole 614 to be in a pluggable fit connection; the screwdriver bit is chosen from existing standard accessory products on the market, and the head of the screwdriver has different patterns which can be configured according to usage requirements of users. As shown in FIG. 9 to FIG. 12, in the embodiment, four screwdriver bits: a straight screwdriver bit, a cross head screwdriver bit, a hexagon socket head screwdriver bit and a wobbler screwdriver bit are configured standardly and are placed in inner cavity holes of the tube-shaped connector above the screwdriver bit fixing seat for selective replacement during use;

a center of a bottom surface of the screwdriver bit mounting hole 614 is provided with a circular through hole 615, and the strong magnet column 63 is fixedly mounted in the circular through hole 615 formed in the center to play a magnetic adsorption role to the screwdriver bit 62 so as to prevent the screwdriver bit from dropping out from the screwdriver mounting hole during use.

An inner circumferential surface of the first inner cavity hole 221 is hexagonal, and the axial circumferential surface of the screwdriver bit fixing seat 61 is in a hexagonal shape capable of being in fit connection with the first inner cavity hole 221 to play an axial circumferential positioning role to the screwdriver bit fixing seat 61 mounted in the first inner cavity hole 221.

Two sides corresponding to the outer circumferential surface of the lower middle part of the screwdriver bit fixing seat 61 are provided with elastic positioning sheets 611, outer surfaces of heads of the two elastic positioning sheets 611 are respectively provided with two symmetrical first inverted buckle feet 612, a circumferential surface of the first inner cavity hole 221 corresponding to the two first inverted buckle feet 612 is provided with a second positioning groove 222, and the two first inverted buckle feet 612 are in buckled connection with the second positioning groove 222 play an axial circumferential positioning role to the screwdriver bit fixing seat 61 mounted in the first inner cavity hole 221.

The middle upper part of the screwdriver bit fixing seat 61 is further provided with a diaphragmatic circular sheet 613, and a bottom surface of the diaphragmatic circular sheet 613 is in leaning connection with the head end surface of the handle bar 22.

The pop-up mini life-saving hammer device includes a pop-up mini life-saving hammer device component 200 and an outer shell consisting of the tail of the handle bar 22 and a tail cover 23 screwed with the tail of the handle bar 22.

The pop-up mini life-saving hammer device component 200 includes a barrel body 7 sealed at a bottom end, a striker pin 8, a striker pin rod 9, a pressing cap 10, a pressing push piece 13, a force accumulating spring 14 that makes the striker pin 8 pop up and a return spring 15 that makes the pressing push piece return, where an upper opening end of the barrel body 7 is connected and fixed with a head cover 16, two sides of the head cover 16 are provided with tongue buckling sheets 161, the two tongue buckling sheets 161 are respectively provided with buckling holes 162, two sides of an outer circumferential surface of an upper opening end of the barrel body 7 corresponding to the two buckling holes 162 are provided with buckle feet 71, and the buckling holes 162 are in corresponding buckled connection with the two buckle feet 71, respectively;

a bottom surface of an inner cavity hole of the barrel body 7 is provided with a second center through hole 72; a lower end surface of the striker pin rod 9 is provided with a center connecting hole 91, and an upper end of the striker pin 8 is fixedly connected in the center connecting hole 91; the striker pin rod 9 is arranged in the inner cavity hole of the barrel body 7 and able to slide vertically to be in fit connection with the inner cavity hole and the striker pin 8 penetrates through the second center through hole 72 and is able to slide vertically to be in fit connection with the second center through hole 72; two sides of an outer circumferential surface of a lower part of the barrel body 7 are further provided with symmetrical second inverted buckle feet 74.

The inner cavity hole of the barrel body 7 is a stepped hole, the upper part of a stepped hole is larger the lower middle part, a circumferential surface of an upper end of the striker pin rod 9 is provided with a limiting convex ring 92, the limiting convex ring 92 is in sliding fit connection with the upper part of the stepped hole of the barrel body 7, two sides of a circumferential surface of the lower middle part of the stepped hole of the barrel body 7 are provided with axially positioned guide chutes 73, and two sides of an axial circumferential surface of the striker pin rod 9 are provided with convex keys 93 in sliding fit connection with the guide chutes 73.

The force accumulating spring 14 is arranged between an upper surface of the striker pin rod 9 and an inner surface of the head cover; the return spring 15 is disposed around the striker pin 8.

A center of a bottom surface of the head cover is provided with a connecting column 163, the surface of the upper end of the striker pin rod 9 is provided with an upper center blind hole 94, the force accumulating spring 14 is arranged in the upper center blind hole 94, and an upper end of the force accumulating spring 14 is disposed around the connecting column 163.

The middle of a bottom surface of an inner cavity of the pressing cap 10 is provided with an upward protruding second circular boss 101, a top surface of the second circular boss 101 is provided with a third center through hole 102 communicated with a bottom end surface of the pressing cap, and the head of the striker pin 8 is inserted into the third center through hole 102 to be in sliding fit connection with the third center through hole.

The lower part of the pressing push piece 13 is a column sleeve provided with an axial through hole 131, the through hole 131 is in a shape with equally wide front and back sides and two arc-shaped ends, a spacing between the equally wide front and back sides of the through hole 131 is set to be of a size allowing the head of the return spring 15 to be movably placed therein, and a spacing between two side surfaces of the through hole is greater than that between the equally wide front and back sides; top surfaces on two sides of the through hole 131 are provided with two symmetrical upward flaky elastic push rods 132, upper parts of the two elastic push rods 132 are opened like bell mouths, inner and outer surfaces of the two elastic push rods 132 are arc-shaped, a spacing between the two inner side surfaces of the lower parts of the two elastic push rods 132 is set to be of a size capable of realizing sliding fit with the axial circumference of the lower part of the striker pin; surfaces of openings of the bell mouths of the upper parts of the two elastic push rods 132 are respectively provided with two guide through hole straight slots 133 equal in width, and the upper ends of the two guide through hole straight slots 133 are in corresponding buckled connection with the two second inverted buckle feet 74, respectively.

The pressing cap 10 and the pressing push piece 13 are sleeved and fixed with each other.

Two sides of a circumferential surface where the pressing cap 10 and the pressing push piece 13 are connected are respectively provided with two corresponding limiting hole slots 103, a circumferential surface of the pressing push piece 13 corresponding to the two limiting hole slots 103 is respectively provided with two limiting raised heads 135, and the two limiting raised heads 135 are in corresponding fit connection with the two limiting hole slots 103, respectively, to play an axial circumferential positioning role to the pressing cap and the pressing push piece.

A circumferential surface of an inner cavity of the pressing cap 10 is provided with two corresponding third inverted feet 104, and the two third inverted buckle feet 104 are respectively buckled to two sides of a top surface of a cylindrical sleeve on a lower part of the pressing push piece 13 to play an axial positioning role to the pressing cap and the pressing push piece.

A pushing lock catch structure 201 that separates the two elastic push rods 132 from the striker pin rod 9 when the striker pin rod 9 is pushed to move toward an upward side of the inner cavity of the barrel body 7 to a setting position is arranged between the two elastic push rods and the striker pin rod 9.

The pushing lock catch structure 201 is structured such that inner surfaces of the lower sides of opened starting ends of the bell mouths on the upper parts of the two elastic push rods 132 are respectively provided with two corresponding pushing raised heads 134, upper surfaces of the two pushing raised heads 134 arranged on the two elastic push rods 132 are respectively perpendicular to the inner surfaces of the two elastic push rods, and the two inner surfaces corresponding to the two pushing raised heads 134 are arc-shaped surfaces; two axial sides of the lower barrel body 7 of the two second inverted buckle feet 74 are provided with two symmetrical windowing holes 75 that are communicated with the inner cavity of the barrel body 7 and extend to the bottom end surface of the barrel all the way, widths of the two windowing holes 75 are set to be capable of placing the two elastic push rods 132 respectively and being in sliding fit connection with the two elastic push rods, respectively; depths of bottom surfaces of bottom plate parts of the barrel body 7 of the two windowing holes 75 are set to be capable of inserting the two pushing raised heads 134 into the inner cavity of the barrel body from the bottom of the barrel; and the two elastic push rods 132 are respectively located in the two windowing holes 75 and are in sliding fit connection when the lower middle parts are static.

An end surface of a bottom opening of the second center through hole 72 is further provided with a downward protruding convex ring column 76, a head of the return spring 15 is in sleeved connection with convex ring column 76 to be positioned, and a tail end of the return spring 15 is in sleeved connection to the second circular convex column 101 to be positioned.

An axial circumferential surface of an upper end of the pressing cap 10 is further provided with a limiting protrusion 105, and the limiting protrusion 105 is in a structure of a convex piece distributed at each of four corners with the head surface. Open grooves 106 wider than the two elastic push rods 132 are formed in positions, corresponding to the two elastic push rods 132, of two sides of the upper surface of the pressing cap 10, and the bottom end surface of the pressing cap 10 is provided with a counterbore 107.

The pressing cap 10 is inserted into the first center through hole 230 from the inner bottom surface of the tail cover 23, is in sliding fit connection with the first center through hole and partially stretches out to the bottom surface of the tail cover 23, the limiting protrusion 105 is in abutting joint to the top surface of the first center through hole 230, and the top surface of the head cover 16 leans against the top surface of the second inner cavity hole 223.

The top surface of the second inner cavity hole 223 is further provided with an upper stepped hole 224, an upper end of the first center through hole 220 is provided with a lower stepped hole 231, the first center through hole 220 and the upper stepped hole 224 are kept at a same axis, and the head cover 16 is located in the upper stepped hole 224 to be positioned.

The cutting knife device includes a cutting knife device component 300 in leaning fixed connection with the outer circumferential surface of one side of the hammer body 1.

The cutting knife device component 300 includes a blade bearing 17, a cutting blade 18 and a fixing screw 19, wherein two axial surfaces on the upper part of the blade bearing 17 are provided with two screw mounting holes 171 with counterbores, the bottom surface of the lower middle part is provided with a recess 173 opened in the left and right side and the lower side, the surface of the recess 173 and the upper surface thereof are provided with blade fixing grooves 172, and the upper part and a side end of the cutting blade 18 are embedded and fixed in the blade fixing grooves 172; the axial upper middle part of the back surface of the hammer 1 is provided with screw fixing holes 120 which are identical in number with the screw mounting holes 171 and correspond to the screw mounting holes 171 in arrangement position, the blade bearing 17 is in fastening connection to the outer circumferential surface of one side of the hammer 1 through the fixing screw 19, the bottom surface of the blade bearing 17 and the bottom end surface of the cutting blade 18 lean against the surface of the hammer 1, an oblique cutting edge part of the cutting blade 18 is aligned with a lower opening of the recess 173; and an inlet part 20 that enables a safety belt to enter is formed between the lower opening of the recess 173 and the surface of the hammer body 1.

A use method of the screwdriver device arranged on the life-saving hammer of the present invention is as follows: when it is desired to use the screwdriver arranged on the life-saving hammer, the hammer body of the life-saving hammer is by one hand, and the handle bar of the hammer handle is rotated anticlockwise by the other hand to separate the handle bar from the tube-shaped connector of the hammer handle, and the handle bar of the hammer handle can serve as the handle of the screwdriver; and then the screwdriver bit with the proper head shape is selected from the inner cavity hole of the tube-shaped connector and is inserted into the mounting hole of the screwdriver bit fixing seat mounted at the head of the handle bar to use.

A working principle and a use method of the pop-up mini life-saving hammer device arranged on the life-saving hammer are as follows: during use, the hammer body of the life-saving hammer is held by hand, so that the end surface of the pressing cap at the tail of the hammer handle leans against glass, the hammer body is pressed to move toward the inner cavity at the tail of the hammer handle, and at the time, the two elastic push rods on the pressing push piece connected with the pressing cap move upwards relative to the lower part of the barrel body till the top surfaces of the two pushing raised heads lean against the bottom surfaces on two sides of the striker pin, the pressing cap is pressed continuously to move upwards in the inner cavity at the tail of the hammer handle, the striker pin rod moves upwards continuously relative to the bottom surface of the inner cavity of the barrel body, and at the time, the force accumulating spring is stressed to compress, and the return spring is stressed to compress as well. At the same time, the lower middle parts of the openings of the bell mouths of the two elastic push rods and two inner surfaces leaning against the outer side edges of the top surfaces of the two windowing holes on the barrel body are subjected to an upward force at the same time, so that the push rods move towards two sides of the barrel body outwards to drive the top surfaces of the two pushing raised heads to be gradually separated from the bottom surfaces on two sides of the striker pin rod. When the top surfaces of the two pushing raised heads are separated from the bottom surfaces on two sides of the striker pin, the striker pin enables a tip part of the striker pin to pop up from the center through hole of the pressing cap rapidly to crush the glass under the action of an elastic force generated by instantaneously releasing energy of the force accumulating spring, and meanwhile, under the action of the elastic force of the return spring, the whole system components are reset automatically, namely, they are restored to initial states, and can be repeatedly used.

Those skilled in the art can further alter and modify the above-mentioned implementations properly according to uncovering and educating of the above-mentioned description. Therefore, the present invention is not limited to the above uncovered and described specific implementation modes, and some modifications and alternations of the present invention shall also fall into the scope of protection of claims of the present invention. Besides, although some specific terms are used in the description, these terms are merely for the convenience of description and do not have any restriction on the present invention.

What is claimed is:

1. A multifunctional life-saving hammer, comprising a hammer body (1) and a hammer handle (2), two end surfaces of the hammer body (1) being respectively provided with mounting base holes (11), two mounting base holes (11) being respectively connected and fixed with a pointed hammer (3) and a butt hammer (4), one side of a middle of the hammer body (1) being provided with a hammer handle connecting hole (12), wherein the hammer handle (2) comprises a hollow tube-shaped connector (21) and a handle bar (22), a tail end opening of the hollow tube-shaped connector (21) is provided with an internal thread, a head of the handle bar (22) is provided with an external thread, the hollow tube-shaped connector (21) and the handle bar (22) are detachably screwed and fixed, a head of the hollow tube-shaped connector (21) is in fixedly connected with the hammer handle connecting hole (12) in a close fit manner, and a top surface of the head of the handle bar (22) is further provided with a first inner cavity hole (221);

a tail of the handle bar (22) is provided with a second inner cavity hole (223) opened in a bottom end surface, and an opening of the second inner cavity hole (223) is provided with the internal thread; a tail cover (23) provided with the external thread is screwed and fixed with the opening of the second inner cavity hole (223), wherein the external thread is arranged on a head of the tail cover (23), and an inner bottom surface of the tail cover (23) is provided with a first center through hole (230); and an upper portion of the hammer handle (2) is provided with a screwdriver device, and a tail of the hammer handle (2) is provided with a pop-up mini life-saving hammer device.

2. The multifunctional life-saving hammer according to claim 1, wherein the mounting base holes (11) formed in two ends of the hammer body (1) are respectively provided with threaded openings, connecting ends of the pointed hammer (3) and the butt hammer (4) are respectively provided with external threads, and the pointed hammer (3) and the butt hammer (4) are respectively screwed and fixed to the two mounting base holes (11).

3. The multifunctional life-saving hammer according to claim 1, wherein at least one of the two mounting base holes (11) is provided with a through hole (111) connected with the hammer handle connecting hole (12), and the through hole (111) is provided with a positioning fixed bolt (5) for preventing the connector (21) and the hammer handle connecting hole (12) from loosening.

4. The multifunctional life-saving hammer according to claim 3, wherein an end of one side of the positioning fixed bolt (5) close to a hammerhead is provided with a circular ring (51), a bottom surface of the circular ring (51) leans against a bottom surface of the hammerhead, an upper surface of the circular ring leans against a step surface where each of the mounting base holes (11) and the through hole (111) transition, a center of a top surface of the positioning fixed bolt (5) is provided with a circular boss (52), a middle of the connector (21) corresponding to the through hole (111) is provided with a positioning groove (211), and the circular boss (52) is embedded into the positioning groove (211) to be bolted and fixed.

5. The multifunctional life-saving hammer according to claim 1, wherein the screwdriver device comprises a screwdriver device component (6), a screwdriver bit storage cavity consisting of the inner cavity holes of the tube-shaped connector (21), and a screwdriver handle consisting of the handle bar (22).

6. The multifunctional life-saving hammer according to claim 5, wherein the screwdriver device component (6) comprises a screwdriver bit fixing seat (61), a screwdriver bit (62) and a strong magnet column (63), the screwdriver device component (6) is fixedly connected to the first inner cavity hole (221) formed in the head of the handle bar (22) in close fit through the screwdriver bit fixing seat (61), and an upper portion of the screwdriver bit fixing seat (61) stretches out to a surface of an opening end of the first inner cavity hole (221);

a center of a top surface of the screwdriver bit fixing seat (61) is provided with a hexagonal screwdriver bit mounting hole (614), an axial circumferential surface of a lower middle part of the screwdriver bit (62) is identical in shape with the screwdriver bit mounting hole (614), and the lower middle part of the screwdriver bit (62) is placed in the screwdriver bit mounting hole (614) to be in a pluggable fit connection; and a center of a bottom surface of the screwdriver bit mounting hole (614) is provided with a circular through hole (615), and the strong magnet column (63) is fixedly mounted in the circular through hole (615) formed in the center.

7. The multifunctional life-saving hammer according to claim 6, wherein an inner circumferential surface of the first inner cavity hole (221) is hexagonal, and the axial circumferential surface of the screwdriver bit fixing seat (61) is in a hexagonal shape capable of being in fit connection with the first inner cavity hole (221).

8. The multifunctional life-saving hammer according to claim 6, wherein two sides corresponding to the outer circumferential surface of the lower middle part of the screwdriver bit fixing seat (61) are provided with elastic positioning sheets (611), outer surfaces of heads of the two elastic positioning sheets (611) are respectively provided with two symmetrical first inverted buckle feet (612), a circumferential surface of the first inner cavity hole (221) corresponding to the two first inverted buckle feet (612) is provided with a second positioning groove (222), and the two first inverted buckle feet (612) are in buckled connection with the second positioning groove (222).

9. The multifunctional life-saving hammer according to claim 1, wherein the pop-up mini life-saving hammer device comprises a pop-up mini life-saving hammer device component (200) and an outer shell consisting of the tail of the handle bar (22) and a tail cover (23) screwed with the tail of the handle bar (22).

10. The multifunctional life-saving hammer according to claim 9, wherein the pop-up mini life-saving hammer device component (200) comprises a barrel body (7) sealed at a bottom end, a striker pin (8), a striker pin rod (9), a pressing cap (10), a pressing push piece (13), a force accumulating spring (14) that makes the striker pin (8) pop up and a return spring (15) that makes the pressing push piece return, an upper opening end of the barrel body (7) is connected and fixed with a head cover (16), and a bottom surface of an inner cavity hole of the barrel body (7) is provided with a second center through hole (72); a lower end surface of the striker pin rod (9) is provided with a center connecting hole (91), and an upper end of the striker pin (8) is fixedly connected in the center connecting hole (91); the striker pin rod (9) is arranged in the inner cavity hole of the barrel body (7) and is able to slide vertically to be in fit connection with the inner cavity hole and the striker pin (8) penetrates through the second center through hole (72) and able to slide vertically to be in fit connection with the second center through hole (72); two sides of an outer circumferential surface of a lower portion of the barrel body (7) are further provided with symmetrical second inverted buckle feet (74);

the force accumulating spring (14) is arranged between an upper surface of the striker pin rod (9) and an inner surface of the head cover; the return spring (15) is disposed around the striker pin (8);

a middle of a bottom surface of an inner cavity of the pressing cap (10) is provided with an upward protruding second circular boss (101), a top surface of the second circular boss (101) is provided with a third center through hole (102) communicated with a bottom end surface of the pressing cap (10), and an axial circumferential surface of an upper end of the pressing cap (10) is further provided with a limiting protrusion (105);

a head of the striker pin (8) is inserted into the third center through hole (102) and is in sliding fit connection with the third center through hole;

a lower portion of the pressing push piece (13) is a column sleeve provided with an axial through hole (131), top surfaces on two sides of the through hole (131) are provided with two symmetrical upward flaky elastic push rods (132), upper portions of the two elastic push rods (132) are opened like bell mouths, surfaces of openings of the bell mouths of the upper portions of the two elastic push rods (132) are respectively provided with two guide through hole straight slots (133) equal in width, and the upper ends of the two guide through hole straight slots (133) are in corresponding buckled connection with two second inverted buckle feet (74), respectively;

the pressing cap (10) and the pressing push piece (13) are sleeved and fixed with each other;

a pushing lock catch structure (201) that separates the two elastic push rods (132) from the striker pin rod (9) when the striker pin rod (9) is pushed to move toward an upward side of the inner cavity of the barrel body (7) to a setting position is arranged between the two elastic push rods (132) and the striker pin rod (9); and the pressing cap (10) is inserted into the first center through hole (230) from the inner bottom surface of the tail cover (23), is in sliding fit connection with the first center through hole and partially stretches out to the bottom surface of the tail cover (23), the limiting protrusion (105) is in abutting joint to the top surface of the first center through hole (230), and the top surface of the head cover (16) leans against the top surface of the second inner cavity hole (223).

11. The multifunctional life-saving hammer according to claim 10, wherein two sides of the head cover (16) are provided with tongue buckling sheets (161), the two tongue buckling sheets (161) are respectively provided with buckling holes (162), two sides of an outer circumferential surface of an upper opening end of the barrel body (7) corresponding to the two buckling holes (162) are provided with buckle feet (71), and the buckling holes (162) are in corresponding buckled connection with the two buckle feet (71), respectively.

12. The multifunctional life-saving hammer according to claim 10, wherein the inner cavity hole of the barrel body (7) is a stepped hole, an upper portion of the stepped hole is larger the lower middle part, a circumferential surface of an upper end of the striker pin rod (9) is provided with a limiting convex ring (92), and the limiting convex ring (92) is in sliding fit connection with the upper portion of the stepped hole of the barrel body (7); and two sides of a circumferential surface of the lower middle part of the stepped hole of the barrel body (7) are provided with axially positioned guide chutes (73), and two sides of an axial circumferential surface of the striker pin rod (9) are provided with convex keys (93) in sliding fit connection with the guide chutes (73).

13. The multifunctional life-saving hammer according to claim 10, wherein a center of a bottom surface of the head cover is provided with a connecting column (163), the surface of the upper end of the striker pin rod (9) is provided with an upper center blind hole (94), the force accumulating spring (14) is arranged in the upper center blind hole (94), and an upper end of the force accumulating spring (14) is disposed around the connecting column (163).

14. The multifunctional life-saving hammer according to claim 10, wherein the limiting protrusion (105) is in a structure of a convex piece distributed at each of four corners with the head surface being arc-shaped.

15. The multifunctional life-saving hammer according to claim 10, wherein the bottom end surface of the pressing cap (10) is provided with a counterbore (107).

16. The multifunctional life-saving hammer according to claim 10, wherein two sides of a circumferential surface where the pressing cap (10) and the pressing push piece (13) are connected are respectively provided with two corresponding limiting hole slots (103), a circumferential surface of the pressing push piece (13) corresponding to the two limiting hole slots (103) is respectively provided with two limiting raised heads (135), and the two limiting raised heads (135) are in corresponding fit connection with the two limiting hole slots (103), respectively; and a circumferential surface of an inner cavity of the pressing cap (10) is provided with two corresponding third inverted feet (104), and the two third inverted buckle feet (104) are respectively buckled to two sides of a top surface of a cylindrical sleeve on a lower portion of the pressing push piece (13).

17. The multifunctional life-saving hammer according to claim 10, wherein the pushing lock catch structure (201) is structured such that inner surfaces of the lower sides of opened starting ends of the bell mouths on the upper portions of the two elastic push rods (132) are respectively provided with two corresponding pushing raised heads (134);

two axial sides of the lower barrel body (7) of the two second inverted buckle feet (74) are provided with two symmetrical windowing holes (75) that are communicated with the inner cavity of the barrel body (7) and extend to the bottom end surface of the barrel all the way, and the two elastic push rods (132) are respectively located in the two windowing holes (75) and are in sliding fit connection when the lower middle parts are static.

18. The multifunctional life-saving hammer according to claim 17, wherein the inner and outer surfaces of the two elastic push rods (132) are arc-shaped; upper surfaces of the two pushing raised heads (134) are respectively perpendicular to the inner surfaces of the two elastic push rods (132), and the two inner surfaces corresponding to the two pushing raised heads (134) are arc-shaped surfaces.

19. The multifunctional life-saving hammer according to claim 10, wherein an end surface of a bottom opening of the second center through hole (72) is further provided with a downward protruding convex ring column (76), a head of the return spring (15) is in sleeved connection with convex ring column (76) to be positioned, and a tail end of the return spring (15) is in sleeved connection to the second circular convex column (101) to be positioned.

20. The multifunctional life-saving hammer according to claim 10, wherein the top surface of the second inner cavity hole (223) is further provided with an upper stepped hole (224), an upper end of the first center through hole (230) is provided with a lower stepped hole (231), the first center through hole (230) and the upper stepped hole (224) are kept at a same axis, and the head cover (16) is located in the upper stepped hole (224) to be positioned.

* * * * *